MICHAEL HUMENIK, JR
DAVID MOSKOWITZ
INVENTOR.
BY John R. Faulkner
Thomas H. Oster
ATTORNEYS MICHAEL HUMENIK, JR.
DAVID MOSKOWITZ
INVENTOR.
BY John C. Faulkner
Thomas H. Oster
ATTORNEYS MICHAEL HUMENIK, JR.
DAVID MOSKOWITZ
INVENTOR.
BY John R. Faulkner
Thomas H. Oster
ATTORNEYS MICHAEL HUMENIK, JR.
DAVID MOSKOWITZ
INVENTOR.
BY John R. Faulkner
Thomas H. Oster
ATTORNEYS United States Patent Office Re. 25,815
Reissued July 6, 1965

25,815
METALLIC COMPOSITIONS

Michael Humenik, Jr., and David Moskowitz, Wayne County, Mich., assignors to Ford Motor Company, Dearborn, Mich., a corporation of Delaware Original No. 2,967,349, dated Jan. 10, 1961, Ser. No. 822,048, June 22, 1959. Application for reissue May 21, 1964, Ser. No. 380,727
6 Claims. (Cl. 29—182.7)

Matter enclosed in heavy brackets [ ] appears in the original patent but forms no part of this reissue specification; matter printed in italics indicates the additions made by reissue.

*This invention is a continuation-in-part of that described in application Serial No. 722,040, filed March 17, 1958, now abandoned.*

This invention relates to hard, metallic compositions which are particularly suitable for cutting bits for machining metals at high speeds. These compositions are essentially compacts of titanium carbide together with molybdenum and a metal of the iron group, particularly nickel. The molybdenum may be added to the compact either as metallic molybdenum, or as a carbide of molybdenum, or a mixture of metallic molybdenum and molybdenum carbide. These compacts have been perfected as a decided improvement upon the cemented tungsten carbide tool bits which now enjoy widespread commercial acceptance. This invention is related to a metallic composition which for tool bit purposes is a decided improvement on the metallic compositions taught in United States Letters Patent to Goetzel et al., 2,581,252, January 1, 1952; Goetzel et al., 2,694,007, November 9, 1954; Redmond et al., 2,711,009, June 21, 1955; Goetzel et al., 2,752,666, July 3, 1956; Goetzel et al., 2,753,261, July 3, 1956, and the compositions described by Humenik and Parikh, The Journal of the American Ceramic Society, volume 39, Number 2, February 1956, pages 60, 61, 62 and 63.

Figure 1:
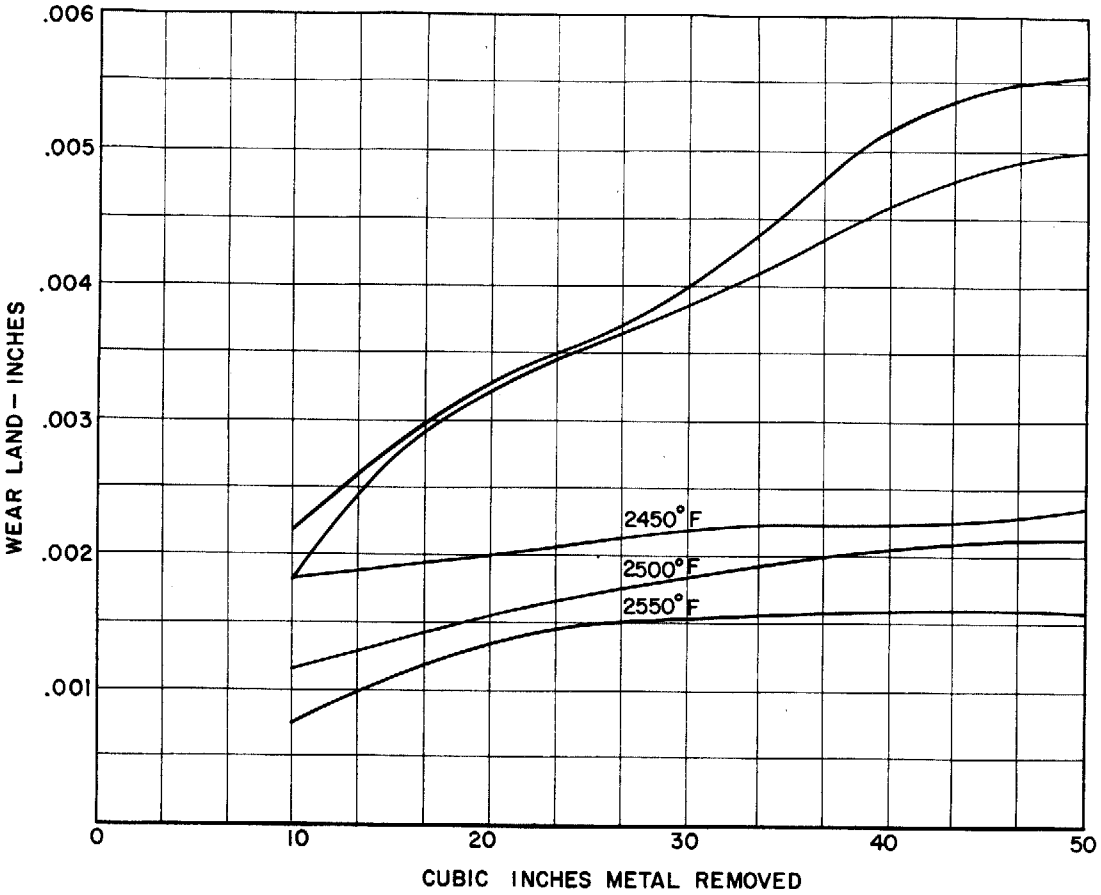
Figure 2:
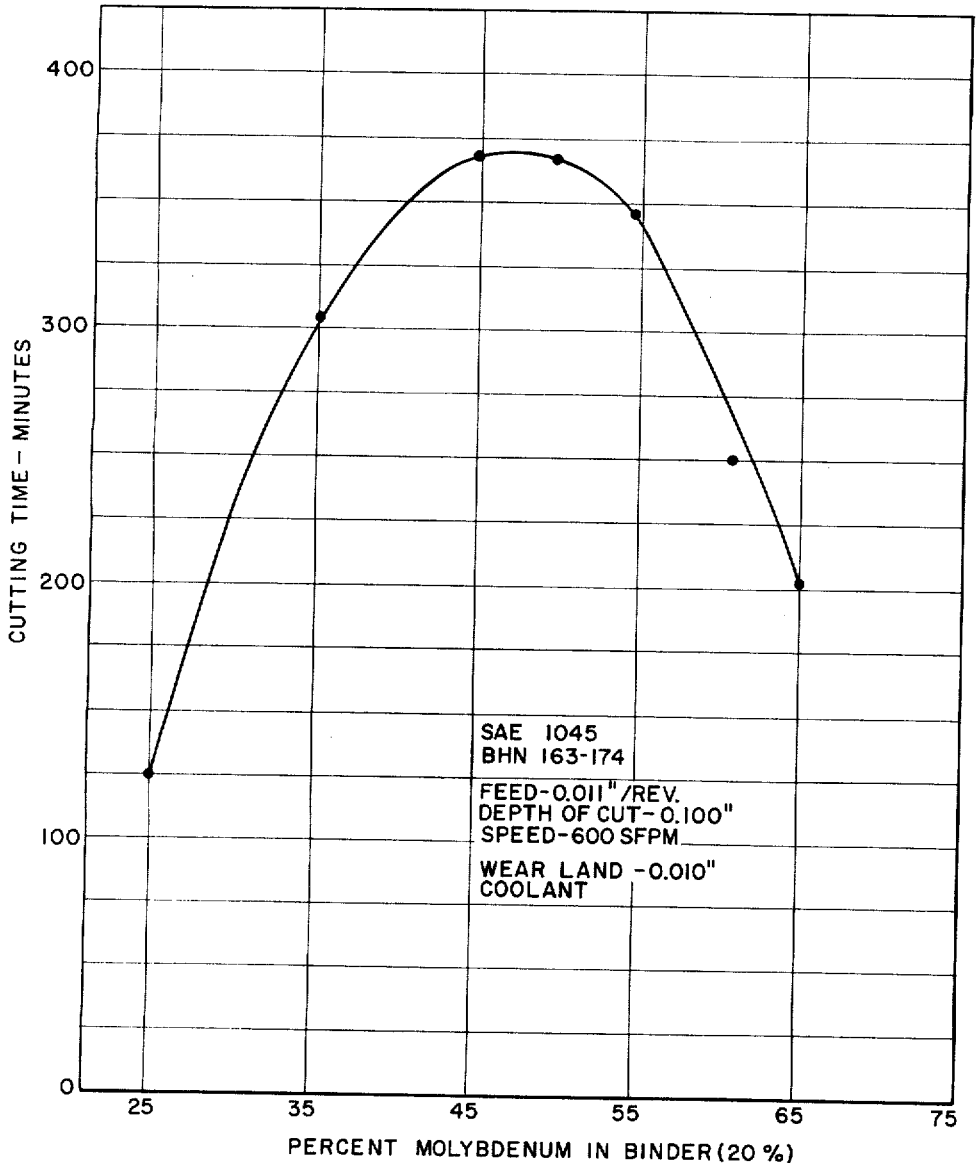
Figure 3:
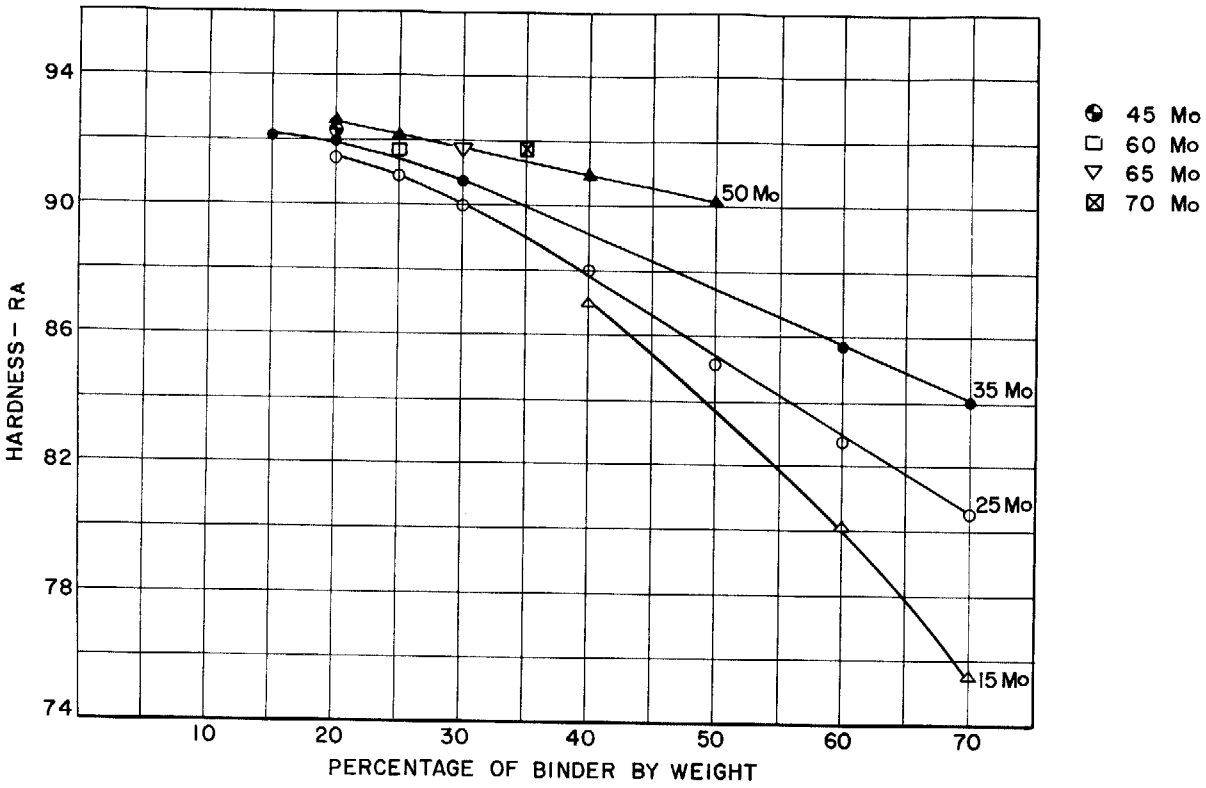
Figure 4:
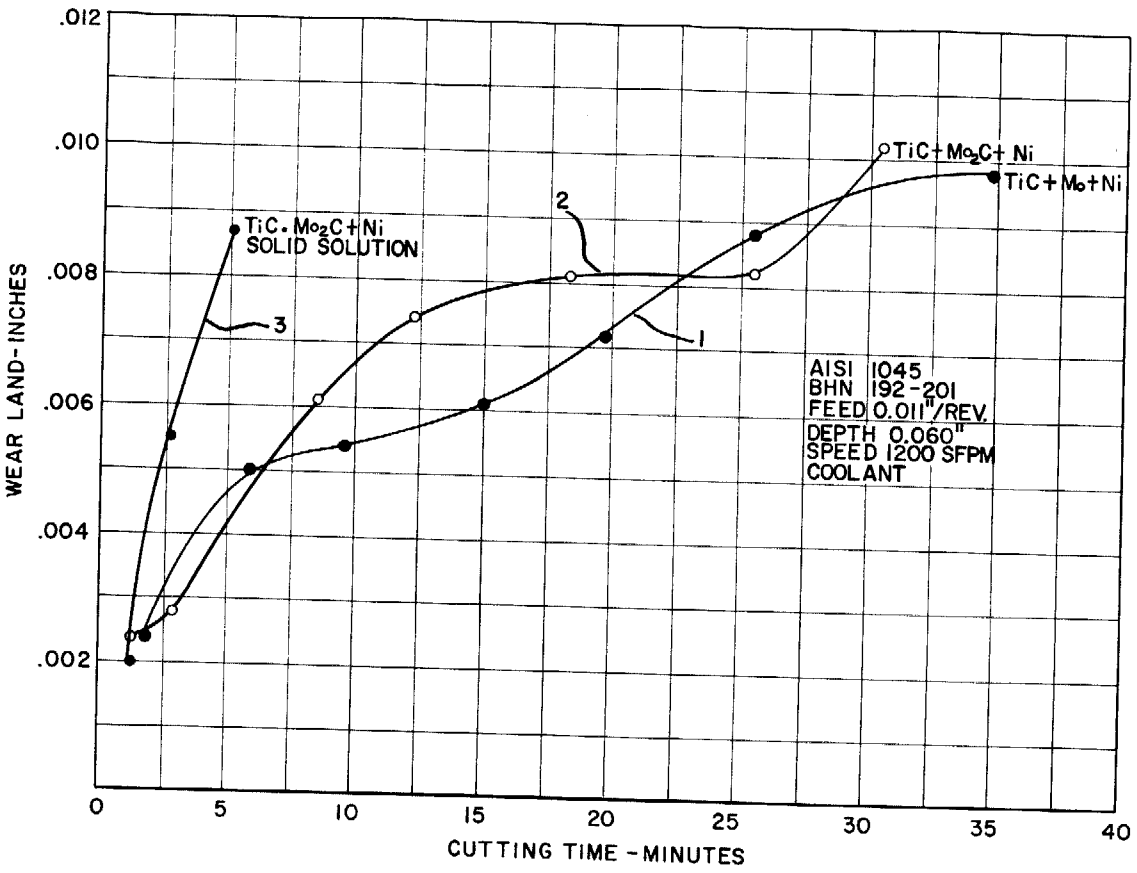

To aid in an understanding of this invention, four figures of drawings have been presented in which:

FIGURE 1 is a graph in which the abscissa represents the amount of metal removed in a cutting operation and the ordinate represents the corresponding tool wear, and FIGURE 2 is a graph in which the percentage of molybdenum in the binding alloy is laid out on the abscissa and the cutting time to a definite tool wear is laid out on the ordinate, and FIGURE 3 is a graph in which the weight percentage of binding alloy is laid out upon the abscissa and the Rockwell A hardness on the ordinate, and, FIGURE 4 is presented to demonstrate the difference in performance between cutting tools based upon solid solutions of molybdenum carbide in titanium carbide and cutting tools fabricated from mixtures of nickel, titanium carbide and molybdenum carbide, or from mixtures of nickel, titanium carbide and molybdenum.

A titanium carbide composition essentially free of oxides and nitrides having the following analysis was chosen as the base material.

| | Percent |
|---|---|
| Free carbon | 1.2 |
| Combined carbon | 19.2 |
| Titanium | 78.1 |
| Iron | 0.06 |

The size analysis of this material as determined by Andraeson particle size analysis was

CUMULATIVE PERCENTAGE OVERSIZE

| | Percent |
|---|---|
| 25 microns | 0 |
| 15 microns | 0 |
| 5 microns | 0 |
| 2 microns | 26.4 |
| 1 micron | 49.5 |

The binding alloy was added as approximately five micron nickel and molybdenum powder. The metal powder was prepared separately by milling a seventy-five percent nickel, twenty-five percent molybdenum powder and fifty percent nickel, fifty percent molybdenum mixture from minus three hundred twenty-five mesh powder. When necessary small additions of minus three hundred twenty-five mesh metal powder were used to give a charge of the desired final composition. The compositions recited in the appended claims refer to the composition of the compact prior to any reactions which may occur during sintering.

The grinding operations were conducted in a stainless steel mill containing Hastelloy B balls, benzene being added to inhibit oxidation of the charge during the twenty-four hour milling period. After milling the benzene was evaporated and four percent wax binder dissolved in benzene was added. Upon drying the powder was pressed in a steel die at a pressure of about ten tons per square inch.

The cold pressed compacts were presintered in a hydrogen furnace at 1200° Fahrenheit for one hour to dewax the specimens. Final sintering was performed on an inert stool and in an inert ambient at 2500° Fahrenheit for one hour in an induction furnace. An absolute pressure of about 0.1 to 0.3 micron was maintained in the furnace although any suitable inert ambient will be satisfactory. Suitable inert ambients are dry hydrogen, argon or helium. The sintering temperature is, of course, a function of sintering time, the time being shortened as the temperature is raised. In any event the sintering temperature should not exceed 2700° Fahrenheit to avoid substantial grain growth. The time and temperature of sintering must be adjusted so that the grain size of the titanium carbide in the finished article is not substantially larger than that of the starting powder.

It is essential that the binding alloy contain at least ten percent of molybdenum to take advantage of the ability of this metal to cause alloys containing it to wet the surface of the hard titanium carbide particles. Bearing in mind this limitation, it is possible to substitute either tungsten or chromium or alloys or mixtures of tungsten and chromium for a portion of the molybdenum.

FIGURE 1 clearly shows the superior performance of the cutting compositions taught by this invention as compared to commercially available cemented tungsten carbide compositions. The data presented in FIGURE 1 was obtained by cutting a log of SAE 1045 steel at a Brinell hardness of 163 to 174 with a feed of 0.011 inch per revolution and a depth of cut of 0.100 inch at a surface speed of 350 feet per minute. The two upper curves represent typical cemented tungsten carbide performance. The three lower curves were obtained using as a cutting bit a composition of 65 percent titanium carbide and 35 percent binding alloy, this binding alloy being 70 percent nickel and 30 percent molybdenum. The powders were milled in a steel mill with steel balls for twenty-four hours under benzene. A wax lubricant was added and the powder was pressed in a steel die at ten tons per square inch. Dewaxing was carried out at 1200° Fahrenheit for one hour in hydrogen and final sintering was performed in vacuo (about 0.1 to 0.3 micron) at temperatures of 2450, 2500 and 2550° Fahrenheit for two hours. The hardness of the sintered specimens ranged from $R_A$ 90.0 to 91.0.

FIGURE 2 is presented to show dramatically the effect of varying the amount of molybdenum in the binding alloy on the durability of the finished tool in machining tests. The data presented in FIGURE 2 was obtained in exactly the same manner and under the same circumstances as those outlined above in connection with FIGURE 1 except that the cutting speed was increased to 600 feet per minute. In each case the tool was operated until a land wear of 0.010 inch was observed. The binding alloys in these tools were fabricated from molybdenum and nickel. The binding alloy in each case comprised 20 percent of the mass of the tool.

FIGURE 3 shows the hardness of the tool compositions as a function of the percentage of binding alloy in the tool composition at four different levels of molybdenum in the binding alloy. In addition, individual points indicate values at 45, 60, 65 and 70 percent molybdenum in the binder.

The graph comprising FIGURE 4 clearly illustrates the contrast in properties between the cutting tools prepared from titanium carbide which is effectively free of dissolved molybdenum carbide and similar tools prepared from titanium carbide containing substantial amounts of dissolved molybdenum carbide. Since the sintering temperatures employed in the preparation of the compacts are high enough to permit the constituents of the compacts to come to equilibrium between the titanium, molybdenum and carbon, it would appear at first blush to be immaterial whether the molybdenum were added as elemental molybdenum, as molybdenum carbide, or as a solid solution of molybdenum carbide in titanium carbide. However, experience has demonstrated that the addition of molybdenum as the carbide dissolved in titanium carbide produces decidedly inferior tools while the addition of molybdenum as elemental molybdenum or as molybdenum carbide not dissolved in titanium carbide produces decidedly satisfactory tools. In FIGURE 4 of the drawing, the curve labelled 1 refers to a compact prepared from titanium carbide, molybdenum and nickel. Curve 2 depicts the performance of a compact prepared from titanium carbide, molybdenum carbide and nickel while curve 3 is concerned with a carbide compact produced from a solid solution of molybdenum carbide in titanium carbide.

The composition, preparation and testing details of the tools depicted in FIGURE 4 follow:

(1) 80TiC+10Mo+10Ni+0.6 free carbon
(2) 80TiC+10.6$Mo_2C$+10Ni
(3) (80TiC/10.6$Mo_2C$) solid solution+10Ni The solid solution carbide was prepared by mixing 80 parts TiC and 10.6 parts $Mo_2C$, compacting the mixture, and sintering for one hour at 2000° C. in a graphite crucible under vacuum. X-ray analysis of the sintered slug showed only one phase to be present, i.e., the TiC/$Mo_2C$ solid solution. The sintered slug was crushed and milled under benzene in a stainless mill to a fine particle size (less than five microns). The milled solid solution powder was then leached repeatedly in a dilute sulphuric acid solution until substantially all milling impurities were removed.

The preparation of the tool composition was similar in all cases, namely, mixing the powders for 48 hours under benzene in a Hastelloy B mill containing Hastelloy B balls, adding a wax lubricant, cold-pressing, de-waxing the samples in hydrogen (1200° F.), and sintering in vacuum for one hour at 2500° F.

The sintered specimens were ground in the form of ½" x ½" x 3/16" throwaway tools, and standard machinability data was obtained using SAE 1045, BHN 192–201, feed 0.011"/rev., depth of cut 0.050", cutting speed 1200 s.f.m., with coolant. The results as shown in FIGURE 4 indicate that similar cutting performance is obtained when molybdenum is added separately as the metal or carbide, although the addition of molybdenum as a solid-solution carbide leads to inferior tool performance.

The iron group metal which is preferred as one member of the binding alloy is nickel. However, any of the iron group metals, or their alloys, may be employed without departing from the spirit of the invention.

It is, of course, essential that all of the steps in the production of the finished tool be carried out so that the final product is free of detrimental amounts of oxides and nitrides.

[This invention is a continuation-in-part of that described and granted in application Serial No. 722,040, filed March 17, 1958, now abandoned.]

We claim:

1. A hard sintered metallic compact particularly suitable for cutting tools, said compact being free of detrimental quantities of nitrides and oxides consisting essentially of titanium carbide and a molybdenum containing binding alloy, said binding alloy consisting essentially of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, *the total molybdenum content of the compact not exceeding 13% of the mass of the compact.*

2. A hard sintered compact particularly suitable for cutting tools and exhibiting a hardness of at least 90 on the Rockwell A scale, said compact being free of detrimental quantities of nitrides and oxides and consisting essentially of titanium carbide and a molybdenum containing binding alloy, said binding alloy consisting essentially of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, *the total molybdenum content of the compact not exceeding 13% of the compact.*

3. A hard sintered compact particularly suitable for cutting tools, said compact being free of detrimental quantities of nitrides and oxides and consisting essentially of titanium carbide and a molybdenum containing binding alloy, said binding alloy consisting essentially of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, said sintering being carried out in an inert ambient at a temperature not substantially above about twenty-seven hundred degrees Fahrenheit, *the total molybdenum*

*content of the compact not exceeding 13% of the mass of the compact.*

4. A hard, sintered metallic compact particularly suitable for cutting tools, said compact being free of detrimental quantities of nitrides and oxides and consisting essentially of titanium carbide and a molybdenum containing binding alloy, said binding alloy consisting essentially of significantly in excess of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, *the total molybdenum content of the compact not exceeding 13% of the mass of the compact.*

5. A hard sintered compact particularly suitable for cutting tools and exhibiting a hardness of at least 90 on the Rockwell A scale, said compact being free of detrimental quantities of nitrides and oxides and consisting essentially of titanium carbide and a molybdenum containing binding alloy, said binding alloy consisting essentially of significantly in excess of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, *the total molybdenum content of the compact not exceeding 13% of the mass of the compact.*

6. A hard sintered compact particularly suitable for cutting tools, said compact being free of detrimental quantities of nitrides and oxides and consisting essentially of titanium carbide and a molybdenum containing binding alloy, said binding alloy consisting essentially of significantly in excess of twenty-five percent to seventy percent of a material selected from the class consisting of molybdenum, molybdenum carbide and mixtures of molybdenum and molybdenum carbide and an alloying metal selected from the group consisting of iron, cobalt, nickel and alloys thereof, *said titanium carbide being essentially free of dissolved molybdenum and molybdenum carbide and* said binding alloy in turn comprising ten to fifty percent of the mass of the compact, said sintering being carried out in an inert ambient at a temperature not substantially above about twenty-seven hundred degrees Fahrenheit, *the total molybdenum content of the compact not exceeding 13% of the mass of the compact.*

References Cited by the Examiner

The following references, cited by the Examiner, are of record in the patented file of this patent or the original patent.

UNITED STATES PATENTS

| | | | |
|---|---|---|---|
| 1,925,910 | 9/33 | Schwarzkopf et al. | 29—182.7 |
| 2,711,009 | 6/55 | Redmond et al. | 29—182.5 |

OTHER REFERENCES

Powder Metallurgy Bulletin, Volume 4, No. 1, Yonkers, N.Y. January 1949. Page 13. TN695 P56.

CARL D. QUARFORTH, *Primary Examiner.*

BENJAMIN R. PADGETT, *Examiner.*